United States Patent [19]

Foster

[11] Patent Number: 5,603,205
[45] Date of Patent: Feb. 18, 1997

[54] TRIMMER AND EDGER APPARATUS

[76] Inventor: Thomas E. Foster, 1800 Loop 360 South, Austin, Tex. 78746

[21] Appl. No.: 527,404

[22] Filed: Sep. 13, 1995

[51] Int. Cl.$^6$ .................................................. A01D 67/00
[52] U.S. Cl. ............................ 56/16.7; 56/12.7; 56/473.5; 56/DIG. 18
[58] Field of Search ...................... 56/16.7, 12.7, 56/12.1, 12.8, 17.2, 16.9, 17.5, 202, 400.14, DIG. 7, DIG. 18, 473.5; 30/276

[56] References Cited

U.S. PATENT DOCUMENTS

| | | | |
|---|---|---|---|
| 2,638,730 | 5/1953 | Davidson | 56/400.14 |
| 3,221,481 | 12/1965 | Mattson et al. | 56/25.4 |
| 3,788,049 | 1/1974 | Ehrlich | 56/16.9 |
| 3,977,078 | 8/1976 | Pittinger, Jr. | 30/276 |
| 4,009,560 | 3/1977 | Wells | 56/400.01 |
| 4,182,100 | 1/1980 | Letter | 56/16.7 |
| 4,224,784 | 9/1980 | Hansen et al. | 56/16.9 |
| 4,358,123 | 11/1982 | Richards | 280/47.13 |
| 4,442,659 | 4/1984 | Enbusk | 56/12.7 |
| 4,512,143 | 4/1985 | Jimenez | 56/16.7 |
| 4,587,800 | 5/1986 | Jimenez | 56/16.9 |
| 4,624,321 | 11/1986 | Pinto | 172/15 |
| 4,679,385 | 7/1987 | Carmine | 56/16.9 |
| 4,688,376 | 8/1987 | Wolfe, Sr. | 56/16.7 |
| 4,703,613 | 11/1987 | Raymond | 56/12.7 |
| 4,704,849 | 11/1987 | Gilbert et al. | 56/17.5 |
| 4,712,363 | 12/1987 | Claborn | 56/16.7 |
| 4,756,147 | 7/1988 | Savell | 56/16.7 |
| 4,796,415 | 1/1989 | Moore | 56/16.9 |
| 4,802,327 | 2/1989 | Roberts | 56/15.2 |
| 4,829,755 | 5/1989 | Nance | 56/17.1 |
| 4,845,929 | 7/1989 | Kawasaki et al. | 56/17.5 |
| 4,891,931 | 1/1990 | Holland | 56/16.7 |
| 4,914,899 | 4/1990 | Carmine | 56/16.7 |
| 4,922,694 | 5/1990 | Emoto | 56/16.7 |
| 4,936,886 | 6/1990 | Quillen | 56/16.7 |
| 4,953,294 | 9/1990 | Dohse | 30/276 |
| 4,981,012 | 1/1991 | Claborn | 56/16.9 |
| 5,276,969 | 1/1994 | Luick | 56/12.7 X |
| 5,279,102 | 1/1994 | Foster | 56/12.7 X |
| 5,408,816 | 4/1995 | Cartier | 56/17.5 |

OTHER PUBLICATIONS

Owners Manual by "Inertia Dynamics Corporation," *idc* 500 530, pp. 1–16 (Jun. 1991).

Primary Examiner—Terry Lee Melius
Attorney, Agent, or Firm—Arnold, White & Durkee

[57] ABSTRACT

A trimmer apparatus comprising a trimmer device for use in trimming and edging operations, a carriage to which the trimmer device is mounted to support the trimmer device during use, and a handle for use in guiding the apparatus during use. The trimmer device comprises an elongated support shaft, a power unit mounted at a trailing end of the shaft, a trimmer head mounted at a leading end of the shaft, and a drive connection for connecting the power unit to the trimmer head. The trimmer head has a trimmer blade to operate in a blade plane. The trimmer device has a swivel connection to allow the trimmer head to be swiveled between a trimming position where the blade plane is generally parallel to a support surface supporting material to be trimmed during use, and an edging position where the blade plane is generally at right angles to such a support surface during use. The carriage comprises a frame, and a single support wheel rotatably mounted on the frame to support the frame during use. The trimmer device is mounted to the carriage such that the trimmer apparatus will be supported proximate its center of gravity on the support wheel during use. The handle is positioned for an operator grasping the handle for guiding the apparatus during use, to be positioned to one side of the support wheel and at least partially in line with part of an axial projection of the support wheel during normal use. The blade plane in its edging position is substantially parallel to and generally in line with the plane of the support wheel.

17 Claims, 2 Drawing Sheets

TRIMMER AND EDGER APPARATUS

BACKGROUND OF THE INVENTION

This invention relates to a trimmer apparatus for use in trimming and edging operations. The invention further relates to an edger apparatus for use in edging operations.

The trimmer apparatus of this invention has particular application in the trimming of vegetation in the form of grass, weeds, shrubs, brush, and the like. The trimmer and the edger apparatus of this invention also have particular application in performing edging operations such as at the edges of lawns, around flower beds, around shrubs, along the edges of pathways and the like.

Applicant is aware of a number of prior patents which disclose various forms of wheeled carriages for supporting trimmers. These patents include U.S. Pat. Nos. 3,221,481—Mattson et al.; 4,845,929—Saki et al.; 3,977,078—Pittenjar; 4,936,886—Quillen; 4,182,100—Litter; 4,891,931—Holland; 4,442,659—Enbusk; 4,981,012—Claiborne; 4,829,755—Nance; and 5,408,816—Cartier. These patents do, for the most part, present a number of disadvantages.

Some of these disadvantages are that the operator has to support a major portion of the weight of the apparatus; that the apparatus is not supported near its center of gravity; that the apparatus is designed to be operated lawn-mower fashion so that lateral maneuverability of the apparatus is limited; that the operator can not position himself near the center of gravity of the apparatus during use; that the apparatus can not readily traverse obstacles during use; that the apparatus is bulky and difficult to handle, and that the apparatus restricts the reach of the clearing head of the apparatus during use.

Of the above patents, U.S. Pat. Nos. 3,221,481—Mattson et al. and 4,936,886—Quillen disclose an apparatus which has a trimmer head which is displaceable between a trimming position and an edging position. These two patents present at least some of the same disadvantages discussed above.

Applicant is also the patentee of U.S. Pat. No. 5,279,102 which issued Jan. 18, 1994.

Applicant's prior patent relates to a clearing apparatus and to a carriage for a clearing apparatus which can reduce or overcome one or more of the disadvantages presented by the prior patents discussed above, and by the prior patents and the publication made of record during prosecution of Applicant's Pat. No. 5,279,102.

Applicant's present invention relates to certain additions, improvements or developments in or relating to some aspects of a trimmer apparatus for use in both trimming and edging operations, and to an edger apparatus for use solely in edging operations.

Applicant incorporates Applicant's prior U.S. Pat. No. 5,279,102 by reference into this application. Applicant also hereby makes of record all prior art of record in Applicant's prior Pat. No. 5,279,102.

In accordance with one aspect of this invention, there is provided a trimmer apparatus comprising a trimmer device for use in trimming and edging operations, a carriage to which the trimmer device is mounted to support the trimmer device during use, and a handle for use in guiding the apparatus during use; the trimmer device comprising an elongated support shaft, a power unit mounted at a trailing end of the shaft, a trimmer head mounted at a leading end of the shaft, and a drive connection for connecting the power unit to the trimmer head; the trimmer head having a trimmer blade to operate in a blade plane; the trimmer device having a swivel connection to allow the trimmer head to be swiveled between a trimming position where the blade plane is generally parallel to a support surface supporting material to be trimmed during use, and an edging position where the blade plane is generally at right angles to such a support surface during use; the carriage comprising a frame, and a single support wheel rotatably mounted on the frame to support the frame during use; the trimmer device being mounted to the carriage such that the trimmer apparatus will be supported proximate its center of gravity on the support wheel during use; the handle being positioned for an operator grasping the handle for guiding the apparatus during use, to be positioned to one side of the support wheel and at least partially in line with part of an axial projection of the support wheel during normal use; and the blade plane in its edging position being substantially parallel to and generally in line with the plane of the support wheel.

The elongated support shaft may be a support shaft of any suitable type or of any conventional type for use in trimmer devices. Thus, for example, the elongated support shaft may be in the form of a housing which houses or supports the drive connection. The housing may, for example, be tubular and of circular, oval, square or rectangular sections. The housing may also be of channel section, or the like.

In a presently preferred embodiment, the elongated support member is a tubular housing of circular section which houses the drive connection.

The drive connection may be a drive connection of any suitable or conventional type to operatively connect the trimmer head and the power unit.

Thus, for example, the drive connection may comprise or include a flexible drive shaft, a semi-flexible drive shaft, a drive train or the like, depending upon the configuration of the support shaft, for connecting a power unit in the form of a motor to the trimmer head.

Where the power unit is a battery and the trimmer head has an electrical motor associated with it to drive the trimmer head, the drive connection comprises electrical leads or other power connections leading from the battery to the electrical motor.

The swivel connection may be provided, for example, in the elongated support shaft, may be provided in the trimmer head, or may be provided at the leading end of the elongated support shaft between that leading end and the trimmer head.

In a presently preferred embodiment of the invention, the swivel connection is provided in the shaft to define a swivel axis about which a leading portion of the shaft can be swiveled relatively to a trailing portion of the shaft for swiveling the trimmer head between its trimming and edging positions.

In a preferred embodiment of the invention, the swivel axis is parallel or substantially parallel to the blade plane, and is parallel or substantially parallel to the plane of the support wheel.

The swivel connection may include a swivel lock of any suitable or conventional type for locking the swivel connection in a desired position.

The swivel lock may be adapted to lock the swivel connection in either the trimming position of the trimmer head, or the edging position of the trimmer head. Alternatively, if desired, the swivel lock may be adapted to lock the swivel connection at any intermediate position between the trimming position and the edging position of the trimmer head.

In one embodiment of the invention, the swivel lock may include a threaded swivel pin which is displaceable along a swivel slot, and a nut to cooperate with the threaded swivel pin to lock the threaded swivel pin in position along the swivel slot.

In alternative embodiments of the invention, for example, the swivel lock may comprise one or more spring loaded or displaceable pins or buttons, may comprise a split clamp, may comprise a G-clamp, or any other suitable or conventional swivel lock.

While the shaft may extend parallel to the plane of the support wheel, the shaft preferably has at least a portion of the shaft which extends at an acute angle to the plane of the support wheel to position the trimmer head to one side of the plane of the support wheel during trimming operations.

In one example of the invention, the portion of the support shaft which extends at an acute angle to the plane of the wheel, extends at an angle of between about 2° and about 20° to the plane of the support wheel.

In a presently preferred embodiment of the invention, that portion of the support shaft extends at an angle of between about 10° and about 15° to the plane of the support wheel.

In an embodiment of the invention, the leading portion of the support shaft is an angled portion which extends at an angle of between about 25° and about 75° to the plane of the support wheel when the trimming head is in its trimming position.

More preferably, the leading angled portion of the support shaft extends at an angle of between about 50° and about 60° to the plane of the support wheel when the trimmer head is in its trimming position.

This particular arrangement provides the advantage that when an operator is operating the apparatus with the trimmer head in its trimming position, the trimmer head will be substantially in line with the direction of movement of the operator when the operator is moving in the forward direction. This facilitates the ease of use of the trimmer apparatus of this invention.

When the trimmer head is then swiveled into its edging position, the operator will be able to continue to use the trimmer apparatus while walking substantially parallel to the direction of movement of the support wheel and thus substantially parallel to the line along which the trimmer head is performing its edging function.

In an embodiment of the invention, the leading portion of the shaft may be angled to extend at an angle in the lateral direction from the trailing portion of the shaft when the trimmer head is in its trimming position.

The angled leading portion preferably has a length and angle in relation to the diameter of the trimmer blade, for the swivel connection to be at substantially the same height when the trimmer head is in its trimming position and when the trimmer head is in its edging position during use.

This embodiment of the invention provide the advantage that the angle of the support shaft and the height and positioning of the handle will remain substantially constant when the trimmer head is swiveled between its trimming and edging positions.

This provides the further advantage that the trimmer apparatus will remain supported substantially about its center of gravity on the support wheel when the trimmer apparatus is in its trimming position, and when the trimming apparatus is in its edging position, without the need to adjust the center of gravity.

In one embodiment of the invention, where the diameter of the trimmer blade is about 9 inches, the angled leading portion of the shaft may extend at an angle of between about 40° and about 50° to the trailing portion of the shaft when the trimmer head is in its trimming position.

The trimmer apparatus of this invention may also include an edger guide to guide the height of the trimmer head when the trimmer head is in its edging position.

While the edger guide is preferably mounted on the trimmer head, it may also be mounted on the leading portion of the shaft which can be swiveled relatively to the trailing portion. The edger guide is mounted so that when the trimmer head is displaced into its edging position, the edger guide will be brought into position where it can guide the height of the trimmer head during edging operations. The edger guide may be in the form of a guide wheel, a skid, or the like.

The edger guide may also include a guide flange to guide the edger guide along an edge of a curb, sidewalk, or the like during use to assist in maintaining a constant or relatively constant distance from the curb or sidewalk to the plane of the blade during use.

The edger guide may be mounted on a support flange which is mounted on the trimmer head, on a guard for the trimmer head, or on the shaft.

The support flange may be adjustable to permit adjustment of the height at which the blade is supported during use in edging operations.

The guide flange may be a wheel flange which is mounted on the guide wheel. Alternatively, the guide flange may be mounted on the guard, or on the support flange, or on the shaft.

The guide flange may be adjustable to permit adjustment of the spacing between the guide flange and the blade plane.

In one preferred embodiment of the invention, the handle may be arranged for an operator holding the handle to be positioned proximate the center of gravity of the apparatus during use. Thus for an operator to operate the apparatus during use, the operator will be positioned or will be standing proximate the support wheel. Thus the operator will be positioned at least partially or substantially in line with part of an axial projection of the support wheel during normal use.

In a preferred embodiment, the handle is positioned so that an operator grasping the handle for guiding the apparatus during use, will be partially in line with, or alternatively substantially in line with, an axial extension of the wheel axis during use.

The handle may be positioned proximate the center of gravity of the apparatus. Preferably, the handle may be positioned to extend forwardly of the center of gravity of the apparatus, in the direction of the trimmer head during use.

In different embodiments of the invention, the handle may form part of the carriage, may form part of the trimmer device, may be mounted on the carriage, or may be mounted on the elongated support shaft of the trimmer device.

In an embodiment of the invention, the handle may comprise a guide handle as described for use in guiding the apparatus, and a control handle for use in controlling the apparatus. The control handle may preferably be provided on the trailing side of the center of gravity of the apparatus, while the guide handle is provided on the leading side of-the center of gravity of the apparatus.

In one embodiment of the invention, the control handle may be mounted on the elongated support shaft between the power unit and the carriage. In an alternative embodiment of the invention, the control handle may be mounted on the trailing side of the power unit. The control handle may also be mounted on the power unit, on the carriage, or on the guide handle.

The control handle may preferably include a throttle control or switch or the like for controlling the power unit.

In one preferred embodiment of the invention, the guide handle and control handle may be positioned so that when an operator grasps the two handles to operate the apparatus, he or she will be positioned proximate the center of gravity of the apparatus. Thus the operator will preferably be positioned to one side of the support wheel and partially in line with an axial projection of the axis of the wheel.

The guide handle and the control handle are preferably displaceable relatively to each other and also relatively to the trimmer device, to allow for adjustment of the height and positioning of the handles for different sized operators and for different types of trimmer devices.

In an embodiment of the invention, the positions of the guide handle and of the control handle relative to the center of gravity of the apparatus, may be adjustable to suit the requirements of the operator. Any standard adjustment means may be provided for adjusting the positions and heights of the guide handle and control handle.

The power unit may comprise a motor of any conventional or suitable type for driving the trimmer head during use.

Thus, for example, the power unit may comprise a gasoline motor, an electrical motor, or the like.

In an alternative example of the invention, the power unit may comprise a battery. In this example of the invention, an electric motor may form part of the power unit, and the trimmer device would then have a drive connection such as a drive shaft for connecting the trimmer head to the electric motor. Alternatively, an electric motor may form part of the trimmer head, in which case the drive connection would comprise electrical leads to conduct electricity from the battery to the electric motor at the clearing head.

The support wheel of the apparatus of this invention, may be a wheel of any suitable type. While the support wheel may be relatively small, the wheel should preferably be relatively large since this will give the greatest height to the axle of the wheel and thus improve the ease of handling of the apparatus. The larger the support wheel, the more readily can the apparatus be steered over or past obstacles such as stones, rocks, and bumps, and the more readily can the apparatus be caused to traverse an uneven terrain.

For rough terrain, the support wheel may, for example, be in the form of a conventional bicycle wheel. In one preferred embodiment of the invention the bicycle wheel may for example be a 20, 24 or 26 inch diameter wheel.

In a presently preferred embodiment the wheel may be a 24 inch diameter wheel of the type used in wheel chairs. In an alternative embodiment, for smoother terrain, the wheel is preferably a 12 inch diameter wheel.

The support wheel may have an inflatable tire. Alternatively, the support wheel may have a solid tire, a foam-filled tire, a semi-pneumatic tire, or the like. For light duty applications, the wheel may be a blow-molded plastic wheel.

The support wheel may be provided with a large number of bicycle type spokes. Alternatively, it may be provided with a relatively low number of broad support spokes, or even a disc which has the axle mounted at its center, and a tire or the like at its periphery. Also, the axle of the wheel can preferably be off-set to one side to allow more clearance on the other side of the wheel.

The trimmer head may be in the form of a trimmer head of any suitable or of any conventional type having a trimmer blade of any suitable type. Thus, for example, the trimmer blade may comprise a blade of the line type for use in cutting lighter vegetation such as grass, weeds, smaller shrubs and the like. Blades of the line-type are also referred to as blades of the string-type.

Alternatively, the trimmer blade may comprise an annular blade having circumferentially spaced teeth, having circumferentially spaced sets of teeth, or having a plurality of spaced trimmer blades, trimmer chains, or the like which may be pivotally mounted for cutting heavier vegetation such as weeds, shrubs, large shrubs, including brush, small trees, stalks, and the like.

In a preferred embodiment of the invention, the blade plane in its edging position is parallel to and is substantially in line with the plane of the support wheel.

When the blade plane is substantially in line with the plane of the support wheel in its edging position, the blade plane may be directly in line with the plane of the support wheel, or may be laterally spaced from the plane of the support wheel by several inches.

In one embodiment of the invention, the blade plane may be laterally spaced from the plane of the support wheel by between about 0 and 8 inches, and preferably by about 2 to 5 inches.

The invention further extends to an edger apparatus comprising an edger device for use in edging operations, a carriage to which the edger device is mounted to support the edger device during use, and a handle for use in guiding the edger apparatus during use; the edger device comprising an elongated support shaft, a power unit mounted at a trailing end of the shaft, an edger head mounted at a leading end of the shaft, and a drive connection for connecting the power unit to the edger head; the edger head having an edger blade to operate in a blade plane; the carriage comprising a frame, and a single support wheel rotatably mounted on the frame to support the frame during use; the edger device being mounted to the carriage such that the edger apparatus will be supported proximate its center of gravity on the support wheel during use; the handle being positioned for an operator grasping the handle for guiding the apparatus during use, to be positioned to one side of the support wheel and at least partially in line with part of an axial projection of the support wheel during normal use; and the blade plane being substantially parallel to and generally in line with the plane of the support wheel.

It will be appreciated that the edger apparatus of this invention has many elements in common with the trimmer apparatus of this invention. The same considerations therefore apply to those elements of the edger apparatus of this invention which are common to those elements of the trimmer apparatus of this invention. Thus, for example, the different examples of the elements described for the trimmer head, can apply equally to the edger head.

Embodiments of this invention can provide the advantage that the trimmer apparatus can be used effectively for trimming operations where the apparatus is supported substantially about its net center of gravity on the support wheel, and can be easily handled by an operator. When required for edging operations, the trimmer head can readily be swiveled into an edging position. In the edging position, the trimming head is substantially parallel to and generally in line with the plane of the support wheel. Thus, an operator can effectively control the edging apparatus so that the edging operation is performed in line with the support wheel. This arrangement makes it easy for the operator to judge the line along which edging operations must be performed, and to displace the apparatus on the support wheel along that line for accurate and easy edging operations.

BRIEF DESCRIPTION OF THE DRAWINGS

Preferred embodiments of the invention are now described by way of example with reference to the drawings.

With reference to FIG. 1 of the drawings, reference numeral 10 refers generally to a trimmer apparatus in accordance with one preferred embodiment of this invention.

Figure 1:
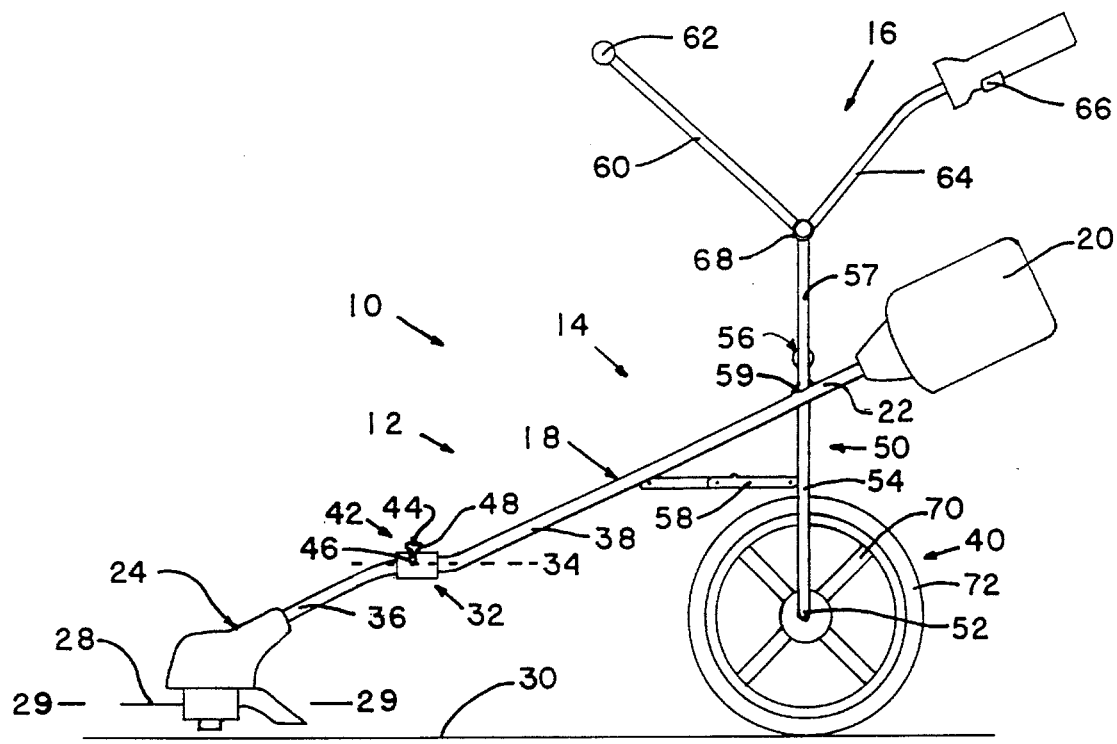
FIG. 1 shows a side elevation of one preferred embodiment of a trimmer apparatus in accordance with this invention, with the trimmer head in its trimming position.

The trimmer apparatus 10 comprises a trimmer device 12 for use in trimming and edging operations.

The trimmer apparatus 10 further comprises a carriage 14 to which the trimmer device 12 is mounted to support the trimmer device 12 during use, and a handle 16 for use in guiding the apparatus 10 during use.

The trimmer device 12 comprises an elongated support shaft 18, a power unit 20 mounted at a trailing end 22 of the support shaft 18, and a trimmer head 24 mounted at a leading end of the shaft 18.

The apparatus 10 further includes a drive connection connecting the power unit 20 operatively to the trimmer head 24.

The support shaft 18 is preferably a tubular shaft of generally circular cross section which houses the drive connection within the shaft 18.

The power unit 20 may, for example, be in the form of a gasoline powered motor or an electric motor. In this embodiment of the invention, the drive connection would be in the form of a flexible drive shaft which extends along the interior of the support shaft 18 between the power unit 20 and the trimmer head 24.

In an alternative embodiment of the invention, the power unit 20 may be in the form of an electric storage battery.

In this embodiment of the invention, the trimmer head 24 may include an electric motor to be powered by the battery. In this embodiment, the drive connection would comprise electrical leads extending between the battery and the electric motor for providing power to the electric motor for driving the trimmer head during use.

The trimmer head 24 has a trimmer blade 28 of the line type, which is designed to operate in a blade plane 29. In FIG. 1 the blade plane 29 is shown to be parallel to a supporting surface 30 on which the apparatus 10 is supported during use.

The trimmer device 12 has a swivel connection 32 to allow the trimmer head 24 to be swiveled between a trimming position as shown in FIG. 1 where the blade plane 29 is generally parallel to the support surface 30 during use, and an edging position where the blade plane 29 is generally at right angles to the supporting surface 30 during use.

In the preferred embodiment, as illustrated in FIG. 1, the swivel connection 32 is provided in the support shaft 18 to define a swivel axis 34 as shown in dotted lines in FIG. 1 about which a leading portion 36 of the support shaft 18 can be swiveled relatively to a trailing portion 38 of the shaft 18 for swiveling the trimmer head 24 between its trimming and edging positions.

Figure 2:
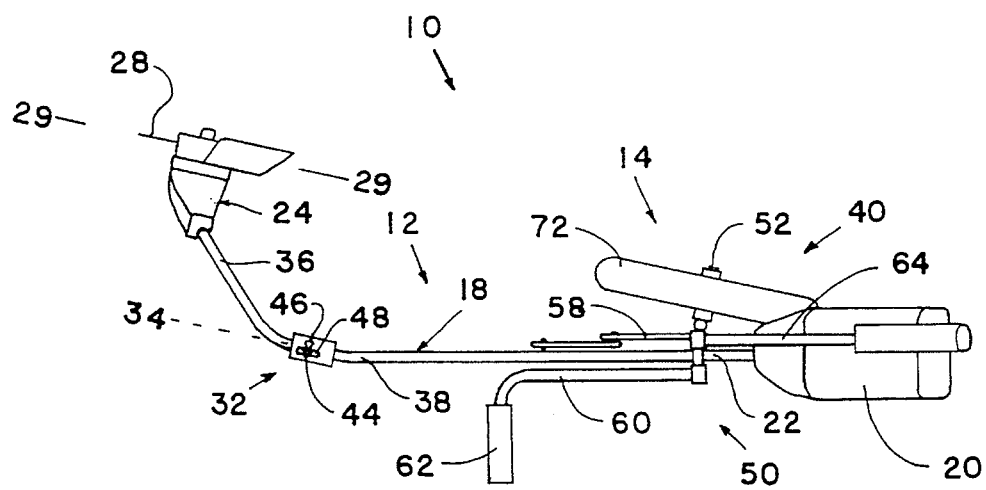
FIG. 2 shows a plan view of an alternative embodiment of a trimmer apparatus in according with this invention, with the trimmer head in its edging position.

As can be seen in FIG. 1 and FIG. 2 of the drawings, the blade plane 29 is parallel to the swivel axis 34 and the swivel axis 34 is also parallel to the plane of the support wheel 40. This provides the advantage that when the trimmer head 24 is swiveled from its trimming position as shown in FIG. 1, to its edging position, as shown in FIG. 2 the blade plane 29 will be substantially parallel to the plane of the support wheel 40 of the carriage 14.

The swivel connection 32 includes a swivel lock 42 for locking the swivel connection in a desired position to maintain the trimmer head either in its trimming position as shown in FIG. 1, or in an edging position where the blade plane 29 is at an angle, and usually at a right angle, to the supporting surface 30.

The swivel lock may be a lock of any suitable or conventional type. Thus, for example, the swivel lock may be in the form of spring loaded pins or buttons, a split clamp, a G-clamp or the like to connect to pivotally displaceable components of the swivel connection. Preferably, however, as shown in FIG. 1 of the drawings, the swivel lock is provided by a threaded swivel pin 44 which is mounted on the leading portion 36 of the shaft 18, and which extends through a swivel slot 46 provided in the swivel connection 32 which is mounted on the trailing portion 38 of the shaft 18. A nut 48 engages with the threaded swivel pin 44. By tightening the nut 48 on the threaded swivel pin the leading portion 36 can be locked relatively to the trailing portion 38 in a desired orientation of the trimmer head 24 relatively to the remainder of the trimmer apparatus 10.

In an alternative preferred arrangement, the swivel lock may be provided by the leading portion 36 having a swivel bearing sleeve mounted thereon, with the swivel bearing sleeve being pivotably located within the leading end of the trailing portion 38 of the shaft 18.

The leading end of the trailing portion 38 is split in the axial direction by means of an axial slot, and a pair of locking flanges extend outwardly from opposed sides of the axial slot.

A bolt extends through the locking flanges, and a wing nut engages with the bolt for drawing the locking flanges together to clamp the leading end of the trailing portion 38 onto the swivel bearing sleeve and thereby locks the leading portion 36 relatively to the trailing portion 38.

The swivel bearing sleeve is preferably of a material such as brass or the like, to provide a bearing surface for the pivotal displacement.

The bearing sleeve has a slot to cooperate with the bolt. The slot is arranged to house a peripheral portion of the bolt. The slot is shaped to limit the pivotal displacement of the swivel bearing sleeve, and thus the leading portion 36, between the trimming position and the edging position of the trimmer head 24.

The slot also locates the swivel bearing sleeve against axial withdrawal out of the leading end of the trailing portion 38 of the shaft 18.

The carriage 14 comprises a frame 50 and the single support wheel 40 which is rotatably mounted on the frame 50 about an axle 52 to support the frame 50 during use.

The trimmer device 12 is mounted on the carriage 14 so that the trimmer apparatus 10 will be supported proximate its center of gravity on the support wheel 40 during use.

As shown in FIG. 1, the frame 50 comprises a main strut 54 which extends generally upwardly from the axle 52 during use, and which has the support shaft 18 mounted thereto at a mounting connection 56, and a connecting strut 58 which extends between the main strut 54 and the support shaft 18 to form a triangular frame 50 for strength and support.

In an embodiment of the invention, the mounting connection 56 may be a pivot connection between the main strut 54 and the shaft 18 to allow the frame 50 to be collapsed by collapsing the connecting strut 58. In this embodiment the shaft 18 has an extension strut 57 welded or clamped thereto at weld 59. The pivot mounting connection 56 is then provided on the extension strut 57, and has the upper end of the main strut 54 pivotally connected to it to form the pivotal connection between the main strut 54 and the shaft 18.

In an alternative embodiment, however, the mounting connection 56 may be a rigid connection between the main strut 54 and the extension strut 57 and thus the shaft 18. Likewise, the connecting strut 58 may be a rigid connection, to provide a rigid triangulated frame 50 for the trimming apparatus.

The handle 16 is mounted on the frame 50 by being mounted on an extension strut 57 which is welded or clamped to the support tube 18 at connection point 59.

The handle 16 comprises a guide handle 60 with a grip 62 to be gripped by an operator for handling the apparatus 10 during use.

The guide handle 60 has its grip 62 positioned so that when an operator grasps the grip 62 of the guide handle 60 to guide the trimmer apparatus 10 for use, the guide handle 60 is positioned so that the operator will be positioned to one side of the support wheel 40 and substantially in line with an axial projection of the axle 52 during normal use.

The handle 16 comprises the guide handle 60 and a control handle 64 for use in controlling the trimmer apparatus 10 and the power unit 20 during use.

In FIG. 1, the control handle 64 is shown having a control knob or throttle 66 for use in controlling the power unit 20 during use.

The guide handle 60 and control handle 64 are pivotally connected to each other where they are mounted on the extension 57 about pivot connection 68.

The guide handle 60 and control handle 64 are therefore displaceable relatively to each other and relatively to the carriage 14 about the pivot connection 68 to allow for adjustment of their heights and relative positions for ease of use by an operator.

The pivot connection 68 includes a locking mechanism for locking the guide handle 60 and control handle 64 in a desired adjusted position. The locking mechanism may be a C-clamp with a clamping bolt or a cam lock mechanism of any conventional type, or may be a locking mechanism of any other suitable type.

The frame 50 is preferably formed of any rigid light weight material such as steel or aluminum or a synthetic plastic material, or a reinforced synthetic plastic material.

In a presently preferred embodiment of the invention, the main strut 54 and the guide and control handles, are preferably formed out of aluminum or thin walled steel tubing of round section.

The support wheel 40 is preferably in the form of a plastic 12 inch diameter wheel having spokes 70 and a tire 72. The tire 72 is preferably a conventional pneumatic or semi-pneumatic tire.

The preferred embodiment of the apparatus 10, as illustrated in FIG. 1 of the drawings, can provide a number of advantages.

By using a single lightweight support wheel 40, the apparatus 10 can easily traverse obstacles such as rocks, stones and bumps which are encountered during normal use of the apparatus 10.

Because the apparatus 10 pivots about a single contact point of the support wheel 40 on the ground, the trimmer head 24 can readily be displaced from side to side during use of the trimmer head in its trimming position to have its maximum effect without the operator having to take unnecessary steps. The reach of the trimmer head 24 is therefore enhanced over that provided by other prior wheel supported devices.

Because the trimmer device 12 and carriage 14 are supported substantially at their center of gravity on the support wheel 40, the apparatus 10 is very easy to control and does not require the operator to carry any significant portion of the weight of the apparatus 10 during use.

During use, therefore, the operator can easily steer the apparatus 10 past obstacles. Further, by using the guide handle 62 and the control handle 64, and because the operator is standing substantially in line with the axis 52 of the axle of the wheel 40, he or she can readily lift the apparatus 10 over obstacles or the like. This is facilitated by the fact that both hands of the operator are substantially in line with the center of gravity of the device during use The preferred embodiment has the further advantage that the carriage 14 is of simple and inexpensive construction, and can be light enough where it can be readily handled, not only for using the apparatus 10 in trimming and edging operations, but also for lifting the apparatus 10 when the apparatus is to be transported or stored.

The apparatus 10 as illustrated in FIG. 1 of the drawings, provides the further advantage that the trimmer head 24 can readily be swiveled between its trimming position as shown in FIG. 1, and an edging position where the blade plane 29 extends at an angle, and usually a right angle, to the surface 30 on which the apparatus 10 is supported during use.

In this position, since the blade plane 29 is parallel to the plane of the support wheel 40, and substantially in line with the plane of the support wheel 40, an operator can readily displace the support wheel 40 along the line where the trimming operation is to be performed. In this way the operator can readily control the apparatus 10 so that the blade plane 29 also moves along the plane where edging is to be performed, for accurate, easy and precise edging.

Because the apparatus 10 is supported about its center of gravity on the single support wheel 40, it can readily be maneuvered to follow a line for edging along pathways, along lawn borders, around shrubs, and the like.

Figure 3:
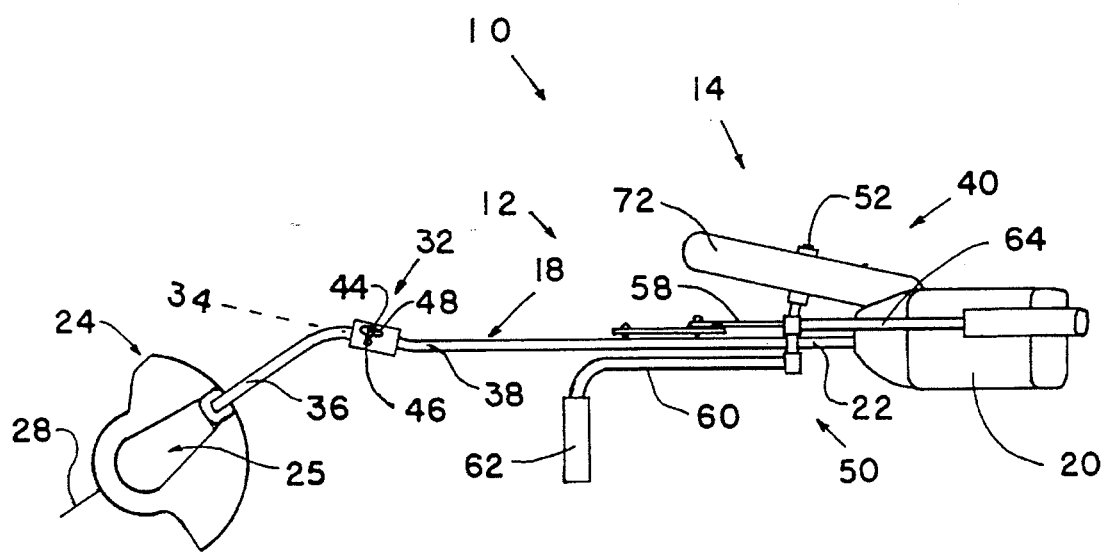
FIG. 3 shows a plan view of the trimmer apparatus of FIG. 2, with the trimmer head in its trimming position.

With reference to FIGS. 2 and 3 of the drawings, these Figures show a plan view of an alternative embodiment of a trimmer apparatus in accordance with this invention.

The embodiment of the trimmer apparatus 10 as illustrated in FIG. 2 and FIG. 3 of the drawings corresponds substantially with the trimmer apparatus 10 as illustrated in FIG. 1 of the drawings. Corresponding parts are therefore indicated by corresponding reference numerals.

In FIG. 2 of the drawings, the trimmer apparatus 10 is shown with the trimmer head in its edging position. In FIG. 3 of the drawings, the apparatus 10 is shown with the trimmer head 24 in its trimming position.

As can be seen particularly in FIG. 2 of the drawings, the swivel axis 34 is substantially parallel to the blade plane 29. As can be seen in FIG. 2 and in FIG. 3 of the drawings, the swivel axis 34 is also substantially parallel to the plane of the support wheel 40.

In FIG. 2 and FIG. 3 of the drawings, the leading portion 36 of the shaft 18 is angled to extend at an angle in the lateral direction from the trailing portion 38 of the shaft 18 when the trimmer head 24 is in its trimming position as shown in FIG. 3.

In the preferred embodiment as illustrated in FIG. 2 and FIG. 3 of the drawings, the angled leading portion 36 extends at an angle of about 45° to the trailing portion 38 of the shaft 18. Further, the length of the leading portion 36 is such in relation to the diameter of the trimmer blade 28 so that the swivel connection 32 can remain at substantially the same height when the trimmer head 24 is in its trimming position as shown in FIG. 3, and when the trimmer head 24 is in its edging position as shown in FIG. 2 during use.

This provides the advantage that the position and height of the guide handle 60 and control handle 64 will remain substantially constant when the trimmer head 24 is displaced between its trimming and edging positions. In addition, because the swivel axis 34 will remain at substantially the same height, the net center of gravity of the apparatus 10 will remain substantially over the support wheel 40 when the trimming head 24 is in its trimming position, and when the trimming head 24 is in its edging position. Thus there should be no need to adjust the center of gravity when adjusting the apparatus 10 between its trimming and edging positions.

In FIG. 2 and FIG. 3 of the drawings, the apparatus 10 has the trailing portion 38 of the support shaft 18 extending at an angle of between about 10° and 20° to the plane of the support wheel 40, and preferably at an angle of about 15° to the plane of the support wheel 40.

This arrangement provides the advantage that when an operator is using the apparatus 10 as illustrated in FIG. 3, in its trimming position, the operator can walk in a direction substantially parallel to the plane of the support wheel 40, and the trimming head 24 will be substantially in the forward direction in which the operator is advancing. This allows ease of use of the apparatus 10 in a trimming operation.

When the trimming head 24 is swiveled into its edging position as shown in FIG. 2, the blade plane 29 will be substantially parallel to the plane of the support wheel 40. However, the blade plane 29 is preferably, in the embodiment shown in FIG. 2, only generally in line with the plane of the support wheel 40. As shown, it is laterally spaced by about 1 to 4 inches from the plane of the support wheel 40 on the side opposed from that on which an operator will be standing when operating the apparatus 10.

Thus in the edging position of the apparatus 10 as illustrated in FIG. 2, an operator can readily guide the trimmer blade 28 along the line where the edging operation is to be performed by moving the support wheel 40 along a line which is conveniently slightly laterally spaced from that edging line where the edging operation is to be performed.

The embodiment of the invention as illustrated in FIG. 2 and FIG. 3 of the drawings, therefore provides the advantage that whether trimming or edging operations are performed, the operator can easily and effectively control the trimming and edging operations.

In the embodiment of the invention as illustrated in FIG. 2 and FIG. 3 of the drawings, the power unit 20 may be in the form of a gas powered motor or an electric motor. Thus the drive connection between the power unit 20 and the trimmer head 24 will preferably be in the form of a flexible drive shaft of any suitable or conventional type.

Alternatively, the power unit 20 may be in the form of a rechargeable battery. In this embodiment, the drive connection includes electrical leads extending along the shaft 18 and leading to an electric motor 25 mounted in the trimmer head 24 for driving the trimmer blade 28.

Figure 4:
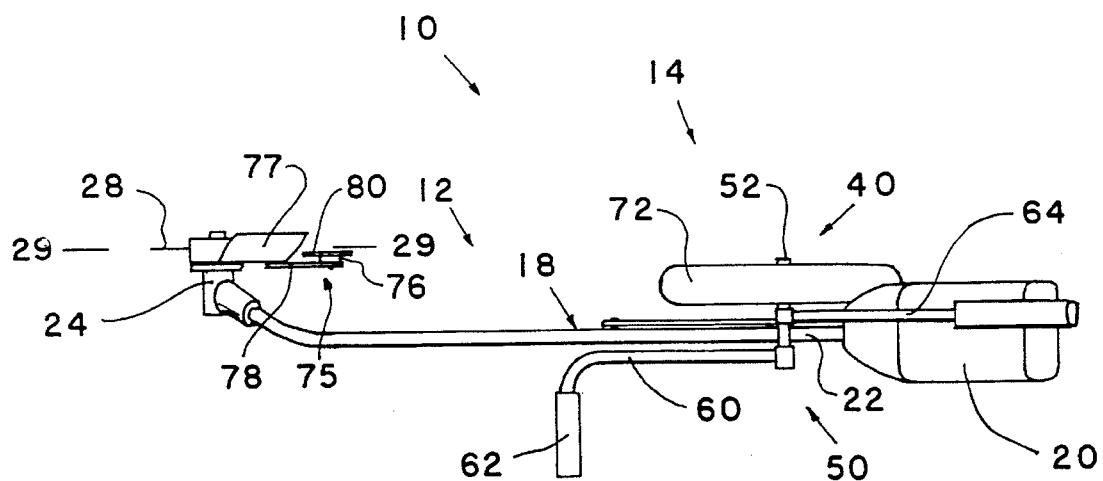
FIG. 4 shows a plan view of an edger apparatus in accordance with this invention.

With reference to FIG. 4 of the drawings, reference numeral 10 refers to yet a further alternative embodiment of an edger apparatus in accordance with this invention.

The edger apparatus 10 of FIG. 4 corresponds generally with the trimmer apparatus 10 as illustrated in FIG. 1, FIG. 2, and FIG. 3 of the drawings. Corresponding parts are therefore indicated by corresponding reference numerals.

In FIG. 4 the edger apparatus 10 is a dedicated edger apparatus which is used solely for edging operations.

The edger apparatus 10 has the support shaft 18 shown extending substantially parallel to he plane of the support wheel 40. It may, however, extend at an acute angle to the plane of the support wheel 40, if desired.

The shaft 18 has its leading end curved so that the edger head 24 is positioned with the edger blade 28 having a blade plane 29 which is parallel to the plane of the support wheel and generally in line with the plane of the support wheel 40.

In the embodiment of the invention as shown in FIG. 4 of the drawings, the edger plane 29 is preferably laterally spaced by about 1 to 5 inches from the plane of the support wheel 40, so that the blade plane 29 is generally in line with the plane of the support wheel 40.

By having the blade plane 29 parallel to the plane of the support wheel 40, and generally in line with the plane of the support wheel 40, an operator can readily control the apparatus 10 to displace the edger blade 28 along an edging line where an edging operation is to be performed.

The edger apparatus 10 comprises an edger guide 75 which is mounted on the edger head 24 to support the edger blade 28 at an appropriate height for edging operations during use.

The edger guide 75 comprises a guide wheel 76 which is mounted on a guard 77 of the edger head 24 by means of a support flange 78.

The support flange 78 may be adjustable to allow for adjustment of the height at which the guide wheel 76 supports the edger blade.

The edger guide 75 further comprises a guide flange 80 which is mounted on the guide wheel 76, to guide the guide wheel 76 laterally along an edge of a curb or the like during use. The guide flange 80 may alternatively be provided on the guard 77 or on the support flange 78.

In an alternative embodiment of the invention the edger guide 75 may comprise a guide skid to guide the height of the edger blade 28

It will be appreciated that a corresponding edger guide of the type described, or of any other suitable or conventional type, may equally be provided in the other embodiments of the invention, and in the embodiments as illustrated specifically in FIGS. 1 to 3 of the drawings.

As described with reference to FIG. 1, FIG. 2 and FIG. 3 of the drawings, the power unit 20 of the edger apparatus 10 may be a gasoline powered motor, an electric motor or a rechargeable battery.

The length of the shaft 18 may be reduced in the edger apparatus 10 as illustrated in FIG. 4, to place the edger head 24 much closer to the support wheel 40 to further facilitate control and use of the edger apparatus 10.

What is claimed is:

1. A trimmer apparatus comprising a trimmer device for use in trimming and edging operations, a carriage to which the trimmer device is mounted to support the trimmer device during use, and a handle for use in guiding the apparatus during use;

the trimmer device comprising an elongated support shaft, a power unit mounted at a trailing end of the shaft, a trimmer head mounted at a leading end of the shaft, and a drive connection for connecting the power unit to the trimmer head;

the trimmer head having a trimmer blade to operate in a blade plane;

the trimmer device having a swivel connection to allow the trimmer head to be swiveled between a trimming position where the blade plane is generally parallel to a support surface supporting material to be trimmed during use, and an edging position where the blade plane is generally at right angles to such a support surface during use;

the carriage comprising a frame, and a single support wheel rotatably mounted on the frame to support the frame during use;

the trimmer device being mounted to the carriage such that the trimmer apparatus will be supported proximate its center of gravity on the support wheel during use;

the handle being positioned for an operator grasping the handle for guiding the apparatus during use, to be positioned to one side of the support wheel and at least partially in line with part of an axial projection of the support wheel during normal use;

the blade plane in its edging position being substantially parallel to and generally in line with the plane of the support wheel; and the swivel connection being provided in the support shaft to define a swivel axis about which a leading portion of the shaft can be swiveled relatively to a trailing portion of the shaft for swivelling the trimmer head between its trimming and edging positions, the swivel axis being generally parallel to both the blade plane and the plane of the support wheel.

2. A trimmer apparatus according to claim 1, in which the blade plane in its edging position is parallel to and is substantially in line with the plane of the support wheel.

3. A trimmer apparatus according to claim 1, in which the swivel axis is parallel to the blade plane.

4. A trimmer apparatus according to claim 1, in which the swivel axis is parallel to the plane of the support wheel.

5. A trimmer apparatus according to claim 1, in which a portion of the shaft extends at an acute angle to the plane of the support wheel to position the trimmer head to one side of the plane of the support wheel during trimming operations.

6. A trimmer apparatus according to claim 5, in which the portion of the support shaft extends at an angle of between about 5° and 20° to the plane of the support wheel.

7. A trimmer apparatus according to claim 6, in which the leading portion of the support shaft is an angled portion which extends at an angle of between about 25° and about 75° to the plane of the support wheel when the trimmer head is in its trimming position.

8. A trimmer apparatus according to claim 7, in which the leading angled portion of the support shaft extends at an angle of about 50° to about 60° to the plane of the support wheel when the trimmer head is in its trimming position.

9. A trimmer apparatus according to claim 1, in which the leading portion of the shaft is angled to extend at an angle in the lateral direction from the trailing portion of the shaft when the trimmer head is in its trimming position.

10. A trimmer apparatus according to claim 9, in which the angled leading portion has a length and angle in relation to the diameter of the trimmer blade, for the swivel connection to be at substantially the same height when the trimmer head is in its trimming position and when the trimmer head is in its edging position during use.

11. A trimmer apparatus according to claim 10, in which a vertical plane through the angled leading portion extends at an angle of between about 40° and about 50° to a vertical plane through the trailing portion of the shaft when the trimmer head is in its trimming position.

12. A trimmer apparatus according to claim 1, having an edger guide to guide the height of the trimmer head when the trimmer head is in its edging position.

13. A trimmer apparatus according to claim 1, in which the handle is positioned for an operator grasping the handle for guiding the apparatus during use, to be partially in line with an extension of the wheel axis during use.

14. A trimmer apparatus according to claim 1, in which the handle is mounted on the carriage.

15. A trimmer apparatus according to claim 1, in which the handle comprises a control handle and a guide handle.

16. A trimmer apparatus according to claim 15, in which the guide handle is positioned on a leading side and the control handle is positioned on a trailing side of the center of gravity of the trimmer apparatus during use.

17. A trimmer apparatus according to claim 1 in which the trimmer blade comprises a blade of the line-type.

* * * * *